(12) United States Patent
Lenander

(10) Patent No.: US 6,401,129 B1
(45) Date of Patent: Jun. 4, 2002

(54) ROUTING FUNCTIONALITY APPLICATION IN A DATA COMMUNICATIONS NETWORK WITH A NUMBER OF HIERARCHICAL NODES

(75) Inventor: Jan Lenander, Askim (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/566,182

(22) Filed: May 5, 2000

Related U.S. Application Data

(63) Continuation of application No. PCT/SE98/01989, filed on Nov. 3, 1998.

(30) Foreign Application Priority Data

Nov. 7, 1997 (SE) .............................................. 9704075

(51) Int. Cl.⁷ ............................................. G06F 15/173
(52) U.S. Cl. ...................... 709/238; 709/239; 709/242; 370/400; 370/237
(58) Field of Search ............................... 709/238, 239, 709/240, 241, 242; 370/237, 408

(56) References Cited

U.S. PATENT DOCUMENTS

| 4,905,233 A | * | 2/1990 | Cain et al. .................. 370/237 |
| 5,115,495 A | * | 5/1992 | Tsuchiya et al. ............ 709/239 |
| 5,526,414 A | * | 6/1996 | Bedard et al. ............... 379/221 |
| 5,719,942 A | * | 2/1998 | Aldred et al. ................. 380/49 |
| 5,721,819 A | * | 2/1998 | Galles et al. ............... 709/243 |
| 5,881,243 A | * | 3/1999 | Zaumen et al. ............. 709/241 |
| 6,091,720 A | * | 7/2000 | Bedard et al. .............. 370/351 |
| 6,189,044 B1 | * | 2/2001 | Thomson et al. ........... 709/242 |

FOREIGN PATENT DOCUMENTS

| DE | 4304916 A1 | 8/1994 |
| EP | 0426911 A1 | 5/1991 |
| WO | 93/16539 | 8/1993 |
| WO | 99/25101 | 5/1999 |

* cited by examiner

Primary Examiner—Krisna Lim
(74) Attorney, Agent, or Firm—Burns, Doane, Swecker & Mathis, L.L.P.

(57) ABSTRACT

A data communication network with a number or origination nodes, a number of destination nodes and a number of intermediate nodes, in which messages are sent from origination nodes via a number of intermediate nodes to destination nodes and in which nodes are added and/or removed in an unpredictable way, has a basic functionality software system accessible via a number of destination nodes. Through the basic functionality software system, a functionality application is made available in at least one destination node and a routing application is associated with the functionality application so that when the functionality application is installed in a node, the routing functionality is automatically provided whereupon the functionality application is presented/offered to other nodes in higher layers. When the functionality application is fetched by an overlying node, such node is also provided with the routing functionality so that the degree of controlling the availability in the network is gradually increased with the number of nodes fetching the functionality application. Methods of increasing the availability in a data communication network are also described.

21 Claims, 7 Drawing Sheets

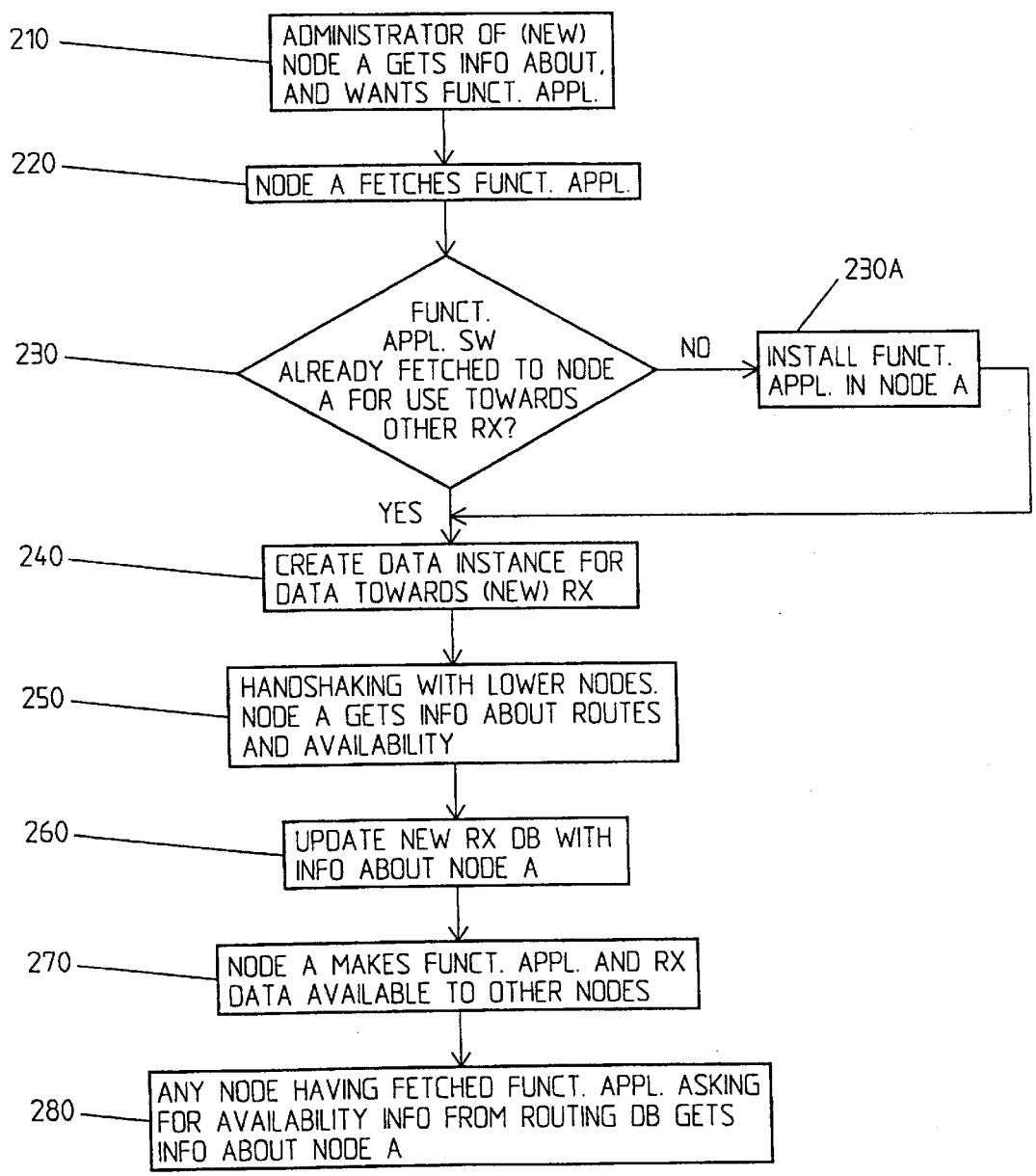

ROUTING FUNCTIONALITY APPLICATION IN A DATA COMMUNICATIONS NETWORK WITH A NUMBER OF HIERARCHICAL NODES

This application is a continuation of International Application No. PCT/SE98/01989 filed on Nov. 3, 1998, which designates the United States.

BACKGROUND

The present invention relates to datacommunication networks in which messages are sent between origination nodes and destination nodes. The invention also relates to methods of providing a high availability in datacommunications networks, particularly in networks wherein nodes are added and/or removed in an unpredictable way.

In various known datacommunication networks the status of different nodes is monitored in different ways so as to obtain some knowledge about the availability of the particular nodes. For example different algorithms can be used to obtain information about the availability of the nodes. In most cases, however, the networks themselves have to be of a particular kind, or the nodes have to be of some particular kind, or both, in order to be able to obtain such information. Particularly no satisfactory solution has been found to control the availability of nodes in a network, the configuration of which is not known or which changes in an unpredictable manner.

Today it is common knowledge to distribute software and the flexibility of ordinary personal computers as far as the receivability and delivery of applications is concerned has increased considerably. Computers are also connected in more in varying manners and a network is resulting in which there is an extremely high number of different routes to the same destination, which network however also changes, or evolves, dynamically. German Patent DE-C4304916 shows a network including datacommunication stations and which is dynamically reconfigurable which means that stations can be added during the operation of the network. Between an origination station for a data message and a final receiving station, a number of stations may exist which can contain algorithms for routing the message. These algorithms can also handle the situation of sending the message another way when a particular communication link has been interrupted. When a new station is added, said station will itself search for a central communication station. According to this document a central communication station is presupposed for keeping control and it is not enabled to provide information about the availability level for particular stations and to obtain a sufficient or desired degree of availability.

German Patent DE-C4428349 relates to routing in a communication network and of achieving a sufficient availability level through allocation of a sufficient amount of alternative routes. In the document is described an algorithm for selecting the route which is the best to use. Said route is excluded from being selected as long as there are other routes if it has indicated that it is busy a predetermined number of times. However, the document does not at all discuss how different routes are established and it does not relate to the situation when new stations are added. In continuously evolving communication networks it is becoming more and more important to be able to obtain information about which is the actual availability, i.e. which is the probability of success when a message is sent from one node to another, but for example also to be able to obtain some information about the time it might take to send a message from one point to another and with what probability of success in what time etc.

If for example messages are sent from a client or a customer administration system (CAS), i.e. any origination node, it is actually possible to say something about the availability of said node. For a destination node such as for example a service management application system (SMAS) or any other application system handling incoming messages, it is also possible to influence the availability or the access. For example it is possible to require a high availability connection to the network such as for example Internet or an intranet. This is however not the only thing that affects the availability that is experienced by an origination system or a user since between an origination node and a destination node, there are large number of intermediate nodes such as for example proxies, which may go down quite often, with serving means, such as for example WEB-servers, mail servers, proxy servers and software crashes occur more or less frequently. Whereas it is normally possible to more or less accurately predict the accessibility or availability of an origination node and a destination node themselves as well as the connection to the global communication network itself, it is extremely difficult to say something about the availability an origination node, or rather the actual user, experiences of a destination node because of all the intermediate equipment or the intermediate nodes, particularly if the network structure changes dynamically through addition (and/or removal) of equipment or nodes.

In a network in which a centralized node is provided keeping information about all the other nodes, messages etc., such as for example an X0.25 network, it is generally less problematic. However, the use of such a solution, i.e. a centralized node, is inflexible or it requires too much intelligence from the application.

SUMMARY

What is needed is therefore a datacommunications network with a number of origination nodes, a number of destination nodes and a number of intermediate nodes in which messages are sent from origination nodes via a number of intermediate nodes to a destination node and in which network nodes can be added and/or removed in an unpredictable way and for which the availability can be affected or controlled in order to establish a high availability connection over an independently evolving network or at least a connection with a sufficient availability.

A communications network is also needed in which it is possible to add new equipment in an unpredictable and independent way and still being able to establish the best choice of route. Particularly a network is needed through which the receiving side can be made as available as possible to a sending side. Still further it is desirable to provide for a high availability even if the number of nodes is very high. Particularly a structure is needed through which the actual need of availability can be satisfied to the highest possible extent and then be extended gradually so that either more messages can be sent or so that the availability can be increased. Particularly there is a need to be able to provide for high availability communication based on ordinary computers in a network with an unknown configuration which is cost-effective, easy to introduce and which can be widely used. A network is also needed wherein there are no particular requirements as to the structure of the network or the nodes themselves and which can be implemented using common computers and common communication methods.

A method of providing high availability communication in a data communication network is also needed as well as a method of providing high availability communication in an independently evolving network particularly offering a high availability communication to the origination node as to destination nodes for their incoming communication.

Therefore a datacommunications network is provided wherein at least a destination node has access to a basic functionality from which a functionality application is offered to other nodes which can fetch it from said destination node. When said functionality application including specific software is fetched by a destination node, a routing functionality application is accompanying or associated with said functionality application.

A functionality application which is considered to be attractive for many users is selected for being associated with the routing functionality and when it has been installed in the node, it is made available to other nodes in a higher hierarchical layer so that the chance that it is fetched by an overlying node is high. In alternative embodiments there are more than one functionality application, e.g. two or more applications are offered. Advantageously a number of parallel nodes in each of at least two different layers fetch the functionality application from a respective node(s) in a lower layer so that said nodes also get access to the routing functionality for routing messages from originating nodes or from nodes in a higher layer. In an advantageous embodiment the functionality application is an availability information application. Thus, a node receiving a stream of messages or of information, i.e. a destination node, can offer a service with processing intelligence and high availability support through offering particular applications such as an availability information application which other nodes or computers easily can fetch via the network, for example Internet or an intranet. The other nodes, computers or proxies, can then start up an application with an availability information functionality and then in turn also offer a routing application as a service to other nodes. A sending or an originating node in this manner is provided with a number of different alternative routes with processing intelligence, e.g. the availability information application and furthermore also a functionality supporting routing of the communication so as to provide for a high availability for said origination node or intermediate nodes acting as origination nodes.

It should be noted that a high availability and routing possibility is only provided up to and including the nodes having accessed the routing functionality but of course even if this functionality has not been fetched to the higher layers, routing is still improved also if it only covers the two lowermost layers (or more) but it should be clear that the more nodes that get access to the availability information and the routing functionality, the more advantage can be taken thereof. Advantageously each installation of the availability information application (or some other application specific application) and the "accompanying" routing application is provided with a unique identification. Then information about the availability for different routes through the network can easily be collected so as to establish whether, and through which route, the desired availability can be achieved.

The simplest form of a routing application is a simple switch-over when a response message either from a malfunctioning route or from other routes indicates that the route that is being used does not function. The applications (availability information application and routing application) which are offered to enable high availability communication to the origination node, can also serve two purposes in that they also give the nodes fetching them the possibility to, in their turn, offer a higher availability for their incoming communication.

The applications are advantageously offered in a multi-stage procedure through which several nodes or computers consecutively fetches and implements the applications.

In a particular embodiment the routing functionality software is provided to nodes in at least two different layers above the destination nodes, routing being controllable also for messages/information sent from a destination node towards origination nodes. In a particular embodiment at least two duplicated data streams are provided between nodes in at least two different layers, the routing functionality being used for selecting the route which to the highest extent fulfills the given needs. The routing functionality particularly includes routing algorithms which are used to find the best routing alternative so as to provide a desired/sufficient degree of availability. Particularly routing is performed, i.e. a route is selected, at the receiving side, e.g. a destination node. The datacommunication network comprises a global datacommunication network, e.g. an intranet or Internet. As referred to above, in a most advantageous embodiment high availability routing is provided for communication of messages both towards a destination node and towards an origination node. In a particular embodiment at least one origination node comprises a customer administration system (CAS) or a client and at least one destination node, in a particular embodiment comprises a service management system (SMS). In at least a number of nodes serving means are provided such as for example WEB-servers, mail servers (or proxy servers as referred to below). In a particular embodiment a client is a WEB-client addressing via Internet or an intranet. At least a number of intermediate nodes, in a particular embodiment, comprise proxies with proxy servers. In a specific embodiment availability information for a specific receiver is stored in storing means such as for example small data storing means, e.g. a cookie (c.f. Internet) communicating with the origination node or more generally a node overlying another, or several other, nodes. Information is continuously updated by the availability functionality. Thus there is no centralized storing of data (e.g. routing DB) for the whole network, however there is at least one routing DB per destination node.

In a particularly advantageous embodiment the routing functionality is provided by a JAVA™ program comprising an interface towards a WEB-server, a calculation part for selecting to which node to route a message and a sender for sending the message to the selected node. Of course other alternatives are also possible and other functionality applications can be offered, or even different functionality applications in some cases, the main thing being that they appear attractive to the users so that as many users as possible fetch the functionality, thereby increasing the overall availability of the network. It should be clear that the concepts origination and destination nodes are not fixed since an intermediate node can act both as an origination node and a destination node.

BRIEF DESCRIPTION OF THE DRAWINGS

The invention will in the following be further described in a non-limiting way and with reference to the accompanying drawings, in which:

FIG. 8 is a flow diagram schematically describing the adding of a new node in a network.

DETAILED DESCRIPTION

Figure 1:
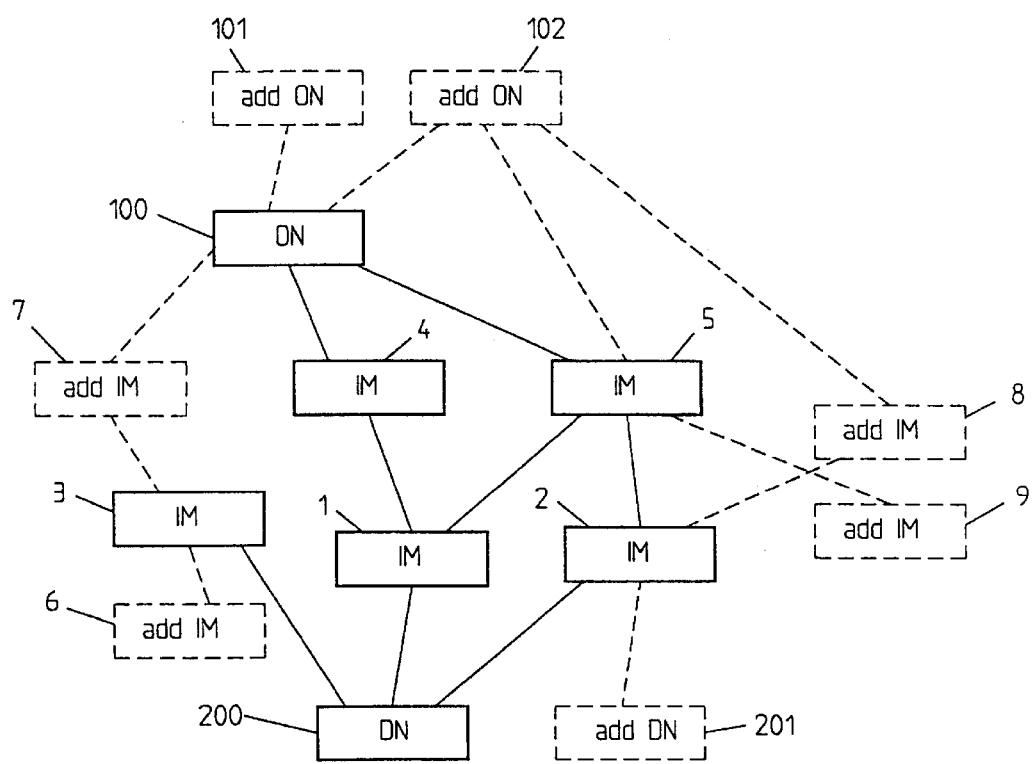
FIG. 1 schematically illustrates a communication network including a number of nodes and to which further nodes are added, FIG. 2 schematically illustrates an intermediate node, FIG. 3 schematically illustrates an implementation including one origination node and one destination node between which a number of intermediate nodes are provided.

FIG. 1 shows a datacommunication network including an origination node 100, a destination node 200 and a number of intermediate nodes (IM) 1,2,3,4,5 which can be said to be arranged in different layers. Such layers are however only fictive and are counted from the lowest node, a destination node and consecutively upwards until the origination node and in which layer a node is arranged changes if additional nodes are added in between. Since the network changes dynamically, for example an additional destination node (add DN) 201 may be added as well as for example two additional origination nodes (add ON) 101, 102. Intermediate nodes, such as for example add IM 6,7,8,9 can also be added in the future. Of course this only shows one example of a dynamically changing network. The intermediate nodes may for example comprise proxies. According to the invention a solution is presented which also functions in such a dynamical situation wherein the number of nodes between an origination nodes and a destination node changes as well as additional origination nodes and destination nodes 201 may be added and wherein the requirements as to availability change with the time. According to the invention a destination node offers a service comprising some kind of specific improving intelligence (functionality application) and a high availability support in that the particular application can be fetched by other nodes or computers over the network so that said nodes in turn can start up an application comprising a processing intelligence (one or more functionality applications) and in addition thereto offer a routing application as a service to other nodes. Advantageously the functionality application that can be offered by the destination node comprises an availability information application and, when this application is fetched by a node, the node simultaneously gets access to a routing application. An alternative functionality application may relate to a validation application intelligence which relates to controlling that the parameters have the appropriate values as close to the user as possible which improves the performance and makes a user experience a much faster response when an error has been committed etc. To be able to control parameters towards a computer address database in one of the IM nodes e.g. proxy nodes is another alternative.

Still further another application may relate to an access control application wherein different users have a different level of access and it is possible to distribute an application informing about which access level is required for different types of requests. For example it is possible to distribute software including a blacklist of the computer addresses not allowed to access the system.

Still further an application may relate to routing to different geographical regions. Still further another intelligent application may relate to splitting up a data packet message into smaller packets. To summarize, the main thing is that an intelligent application is offered which may be attractive to, and wanted by, a number of users and that, associated therewith, is a routing application. The point is to have an attractive application (or more than one) to offer so that through that simple fact it will be wanted, and fetched, by many users who then, at the same time, are provided with a routing functionality so that the routing will be as widely distributed as possible in the network since this is a main issue if it is desirable to provide a high availability throughout as much of the network as possible.

Thus, an application is offered which is so attractive that the user wants that particular software to meet his own needs or requirements but which then has an additional effect that, when someone uses it, it can be used also by others or it is offered to others. Thus the acting of particular users leads to a distribution of a routing functionality gradually increasing the availability and thus a system develops which interacts producing a synergistic effect.

In a particular embodiment an origination node comprises a customer administration system and a destination node may comprise a service management system.

Figure 2:
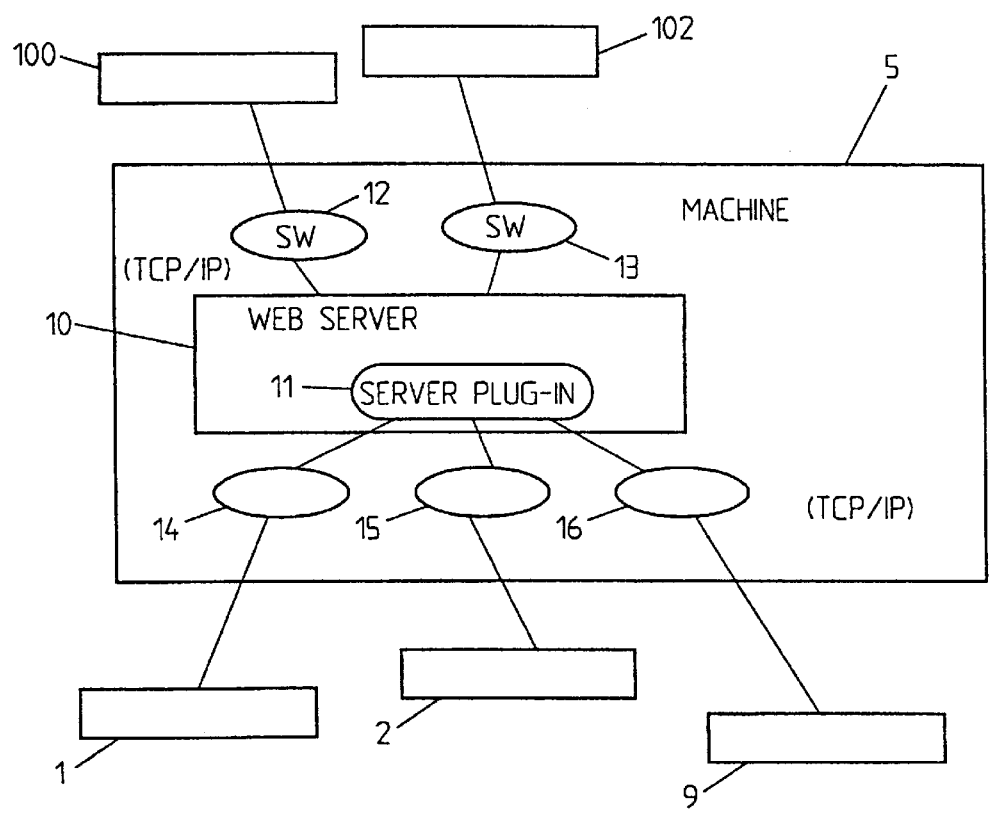

FIG. 2 illustrates the intermediate node 5 of FIG. 1 communicating with origination node 100 and origination node 102 which now is supposed to have been added. Hierarchically below the intermediate node 5 are intermediate nodes 1, 2 and 9 (intermediate node 9 is now supposed to have been added as well). The intermediate node 5 is here supposed to comprise a proxy comprising a computer, e.g. SUNÔ, HPÔ. Intermediate node 5 comprises serving means, in this case a WEB-server 10 communicating with the other nodes via TCP/IP (Transmission control protocol/Internet protocol) 12,13,14,15,16. The WEB-server 10 includes means for introduction of software, in this particular case a so called server plug-in 11. This illustrates the internal components involved in receiving a message from an origination node 100, 102 (or an intermediate node in a higher hierarchical layer) and sending the message on to underlying intermediate nodes or destination nodes.

Figure 3:
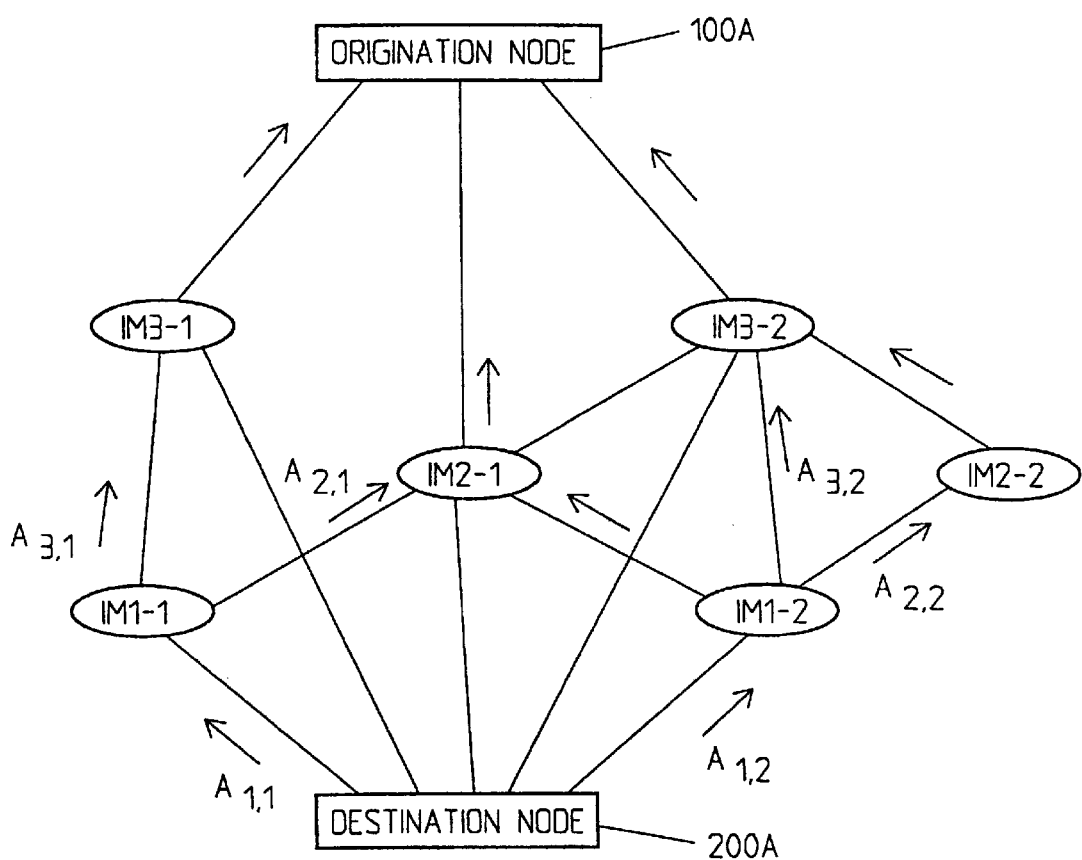

FIG. 3 shows an origination node 100A, also called a sending node, sending messages to a destination node 200A, also called a receiving node. For reasons of clarity there is just one each of an origination node and a destination node in the illustrated embodiment. Between said nodes a number of intermediate nodes IM1-1, IM1-2, IM2-1, IM3-1, IM2-2, IM3-2 are provided. The destination node 200A in this case has installed the intelligent application functionality relating to availability information which is presented to nodes IM1-1, IM2-1 and IM1-2. In this case it is supposed that IM1-1 fetches the availability information application as well as IM1-2, indicated through arrows $A_{1,1}$ and $A_{1,2}$ respectively. However, IM2-1 does not fetch the application. IM1-1 and IM1-2 are thus automatically provided also with the routing functionality. The automatic provision of routing information in connection with communication handshaking upon installation is advantageous. Alternatively routing information might be provided e.g. in connection with a first message holding a question relating to availability level and the handshaking is then done at that occasion. The availability information application is in turn presented to nodes IM3-1, IM2-2, IM2-1 and IM3-2 constituting possible sending nodes to IM1-1 and IM1-2 respectively. IM3-1 fetches the availability information application from IM1-1 (indicated through $A_{3,1}$) and now also IM2-1 fetches the application ($A_{2,1}$) from IM1-2. Also IM2-2 fetches the application ($A_{2,2}$) as well as IM3-2 ($A_{3,2}$). IM2-2 then presents the software to overlying possible sending node IM3-2 but IM3-2 has already fetched the application. Thus in this manner all nodes in the system have been interested (at different times or at different occasions) in the availability information application and at the same time they have got access to the routing functionality. The availability information application has also been presented to the origination node 100A which however in this case has chosen not to fetch the application. However, since the routing functionality is provided in all the other nodes, the availability will still be high towards the destination node.

Figure 4:
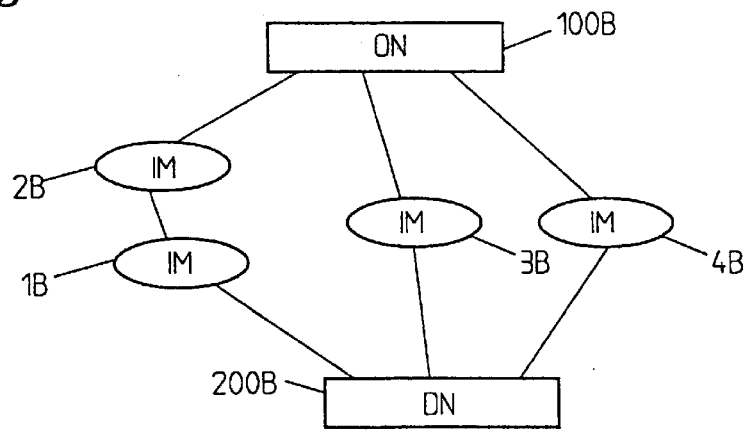
FIG. 4 illustrates one embodiment in which a switch-over is done, FIG. 5 schematically illustrates the serving means of the intermediate node of FIG. 2, FIG. 6 schematically illustrates transfer of routing information.

FIG. 4 illustrates a simple embodiment in which a sending node 100B and a receiving node 200B are provided between which a number of intermediate nodes, 1B,2B,3B,4B are provided. In this embodiment it is supposed that the availability information application and the routing application is installed in all nodes. In this case the receiving node 200B detects that nothing, i.e. no messages, arrive over one of the links (via node 3B) having execution status although messages arrive via the other nodes. Information relating a recommended or requested change of route is then sent over via nodes 1B,2B and/or 4B respectively and a switch over is then done to e.g. the path via nodes 1B,2B.

In another embodiment it is supposed that parallel messages are sent via all nodes having fetched the application and routing functionality. For a more extended network, the parallel sending of duplicated messages is however generally not applied throughout the network, but only to a limited extent since this would load the network too much.

A datacommunication network can be increased in different ways, e.g. through adding new intermediate or receiving nodes, through adding of sending nodes or origination nodes or through increasing the number of destinations available to a node.

The procedure of adding a new node will now be described, for example node 6 in FIG. 1. The functionality application is presented to node 6 by DN 200. Node 6 then fetches the application software from destination node 200, e.g. relating to availability information and routing. Then information is fetched from the underlying node, here destination node 200, which is installed in the new node 6. Added node 6 then makes the application available for example on the WEB to node 3. Intermediate node 3 may then fetch it from node 6. Of course node 3 may already have fetched the application (availability information and routing functionality) from destination node 200, but through fetching information from added node 6 it will also get access to this routing alternative and information about the availability of the route via node 6.

If a new origination node is added, the software relating to availability information application and routing functionality can be fetched. However, it can also be omitted but it will be more cumbersome to fetch the information for routing without the application software and it is generally more advantageous if the software is fetched and present in the sending node, since it is preferable to have routing support also to the lower node which actually has installed the application and also since it can not be excluded, or rather it might be very probable, that a sending node also will be used as an intermediate node at a later stage as the network evolves. If the number of destinations available to a node is to be increased, the information is fetched from underlying nodes and communication paths to newly available nodes is tested and the total availability figure is updated.

The knowledge about other nodes is steadily increased if new nodes are added which fetch the availability and routing functionality. In this way an old node can be provided with information about new routes. A receiving node contains a lot of information and the information is all the time fetched upwards.

In a node sending and receiving messages, it is here supposed that a message is first received from the network for example over TCP/IP. The message is then received for instance in a WEB-server and the server plug-in (c.f. FIG. 2) is called for introduction of the software. The server plug-in then routes the message to a number of different destinations (all destinations it is informed about) and advantageously TCP/IP is used for sending the messages. Although it is mainly referred to Internet, WEB-server etc., of course it can also be an intranet or it may also relate to E-mail in which case the server is a mail server.

A particular functionality relates to selection of the path to use. In a particular embodiment duplicated message sending is implemented and a node that can be reached through several different paths receives several messages which are exactly the same. According to a first embodiment the message coming first is always selected. Then, when a message is received, a check is done to see if it is the first duplicate received. If it is the first message, information about the message is stored and the message is used in the receiving system. Advantageously the sender provides for an easy accessible numbering of the messages, thus providing a solution easy to implement and fault proof.

According to an alternative embodiment, a switch over is done between communication path, as briefly referred to under reference to FIG. 4.

Figure 5:
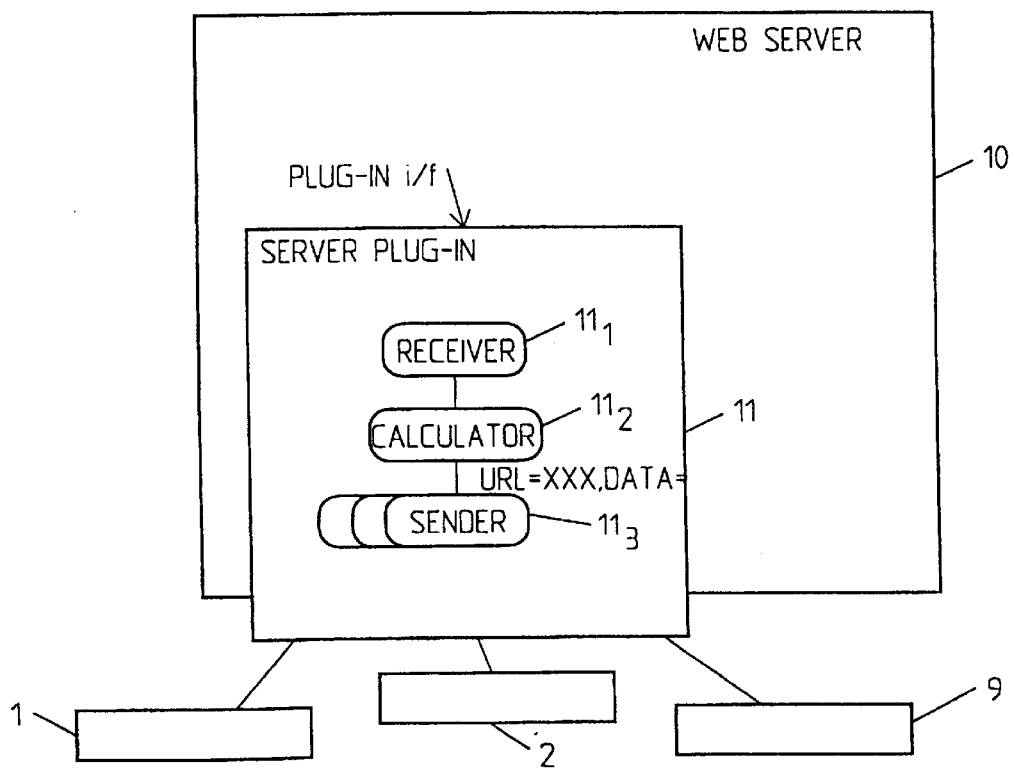

The routing software is advantageously a program that can be easily accessed from the WEB-server 10 (FIG. 5). A number of different implementations are possible but advantageously a simple JAVA™ program is used which has an interface path towards a WEB-server. The server plug-in comprises a receiver $11_1$, a calculating part $11_2$ for finding out to which one of the nodes 1,2,9 where to route messages and a sending part $11_3$ which sends a message to the selected node, 1,2 or 9. The calculating part advantageously also calculates whether a sufficiently high degree of availability is provided.

The main functionality of calculating part $11_2$ comprises two tables, one relating to the systems or the nodes which can be addressed by it and another table comprising information about nodes from where data is received. For updating, the calculating part stores the values that has been sent to it. It also keeps information about the availability figures for different routes.

The sending part may comprise the java.net classes supporting the sending of a message to other destinations. Information about the total availability can be collected in different ways if there are many paths coinciding. If the different paths are unrelated to each other, the total availability is easily calculated by multiplying the figures for probable downtime percentage of the nodes and paths, i.e. the probabilities for paths being down are multiplied. In a particular embodiment is kept track on points where the messages coincide, i.e. nodes where the messages coincide when not using coinciding paths for the total availability figure.

In an alternative embodiment a separate transaction server is used instead of a plug-in server, e.g. a Microsof™ message transaction server. Still further any specific message server can be used if it allows for plug-in of routing software.

Figure 6:
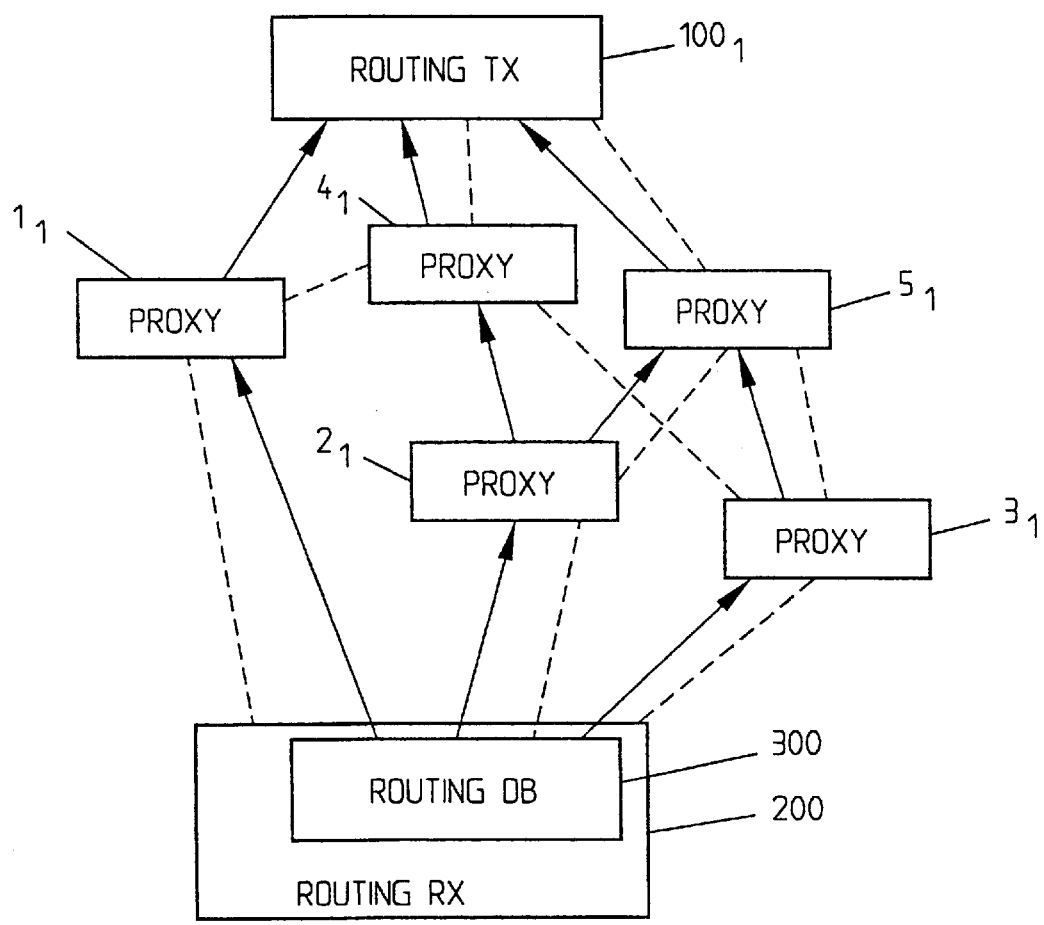

With reference to FIG. 6 the routing functionality will now be briefly discussed. The routing is according to the invention based on the principle that it is the receiver that offers a service. This means that the receiver has to supply the nodes using its service with the routing information they need. Therefore the receiving node comprises/is connected to a routing database which however can be very simple (it may e.g. even be implemented as a cookie), to collect information about a new node when it is introduced and it supplies this information to the nodes using its service, i.e. the offered application including a routing functionality. Advantageously there is at least one routing database per destination node, whereas availability information in a cookie is implemented for every node having implemented the functionality according to the invention.

One way of obtaining a high availability is according to the invention provided through sending several duplicated datastreams through the network. The receiving end must then be able to select only one of the duplicated messages and this can be done in different manners. If however the network including high availability nodes grows, the amount of possible duplicated data streams will increase even more and, advantageously, in order to not unduly load the network, sending nodes only use duplicated paths to a limited extent, to the extent that is needed or to an extent determined according to given criteria. Advantageously this is achieved through an algorithm for giving different paths through the network different priorities and then selecting the amount of paths that is needed as one way. The priority can be determined in a number of different ways. An example thereon is to use the address of the nodes to determine which nodes with the highest probability are closest to each other. Of course priority can also be determined on any other appropriate basis.

In FIG. 6 a network is illustrated comprising an origination node $100_1$ and a destination node (or a receiving node) $200_1$. The availability information application and the routing functionality has been provided to all the nodes, i.e. the sending node, the receiving node and the intermediate proxies $1_1, \ldots, 5_1$. The receiving node $200_1$ comprises, or is connected to, a routing database 300 and in FIG. 5 is illustrated how the routing information is transferred from the routing database. The proxies and the sending node comprise the algorithms as discussed above which make use of the routing information in order to find a suitable number of paths. In FIG. 6 an example of how paths can be chosen is indicated through dashed lines. It should however be clear that this of course merely constitutes one particular example among a number of others. In this case it is supposed that the sending node 101 is the same as the sender of the message and the receiving node is the same as the final receiver of the message. It is however also possible that there is a complete message path constituted by a number of sending/receiving configurations each of which serving a specific geographic domain or anything else.

Figure 7:
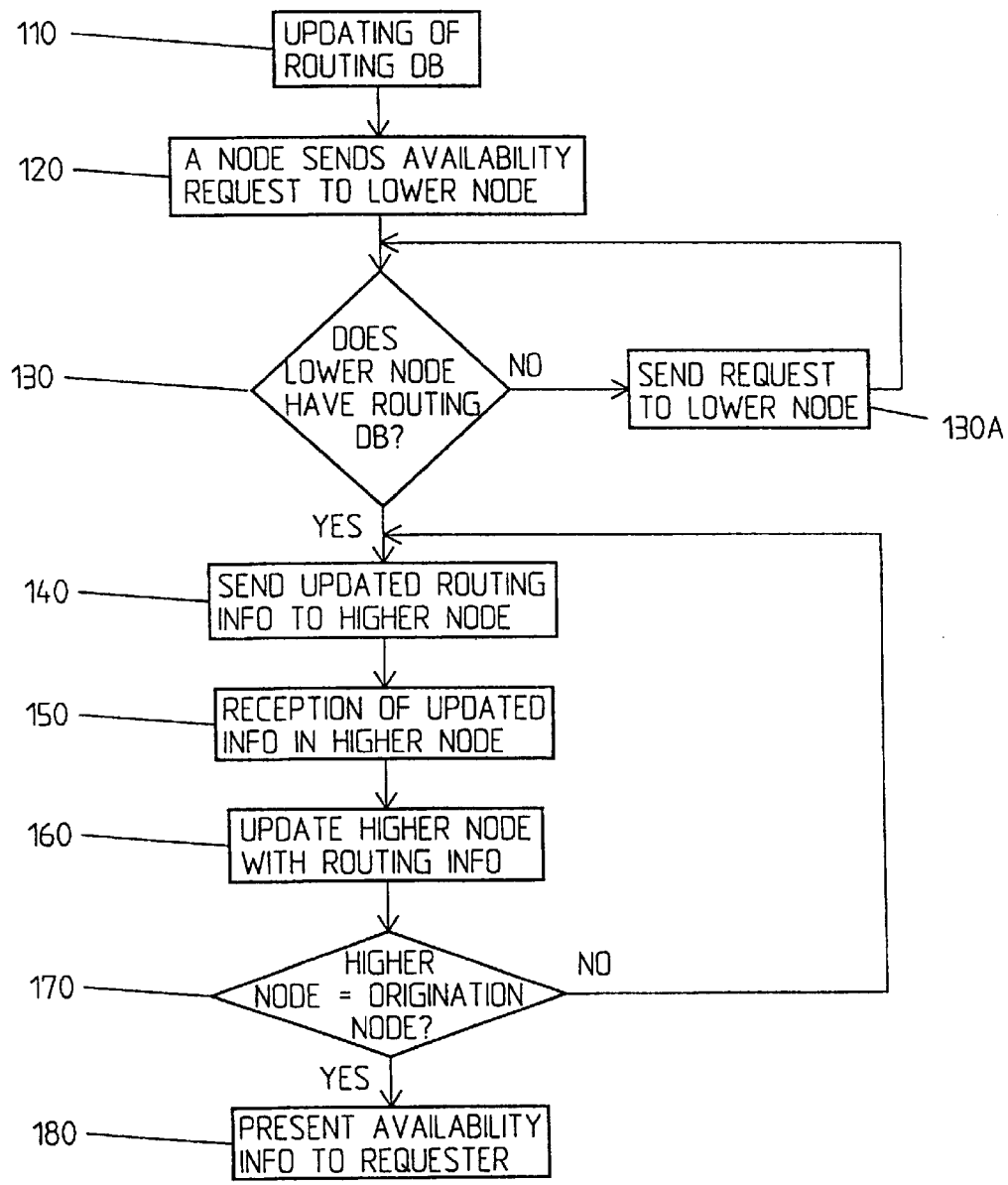
FIG. 7 is a flow diagram schematically illustrating the updating of a routing application.

In FIG. 7 updating of routing information is schematically illustrated in a flow diagram. A routing database is updated because a new node is added or a node is removed or because a new path between nodes is added, 110. With a new node is here meant either an added node or a node already present in the network but which had not previously fetched the functionality application according to the invention. If a node wants availability information (any node), that node sends an availability request to an underlying node (also called a lower node), 120. It is then examined if said lower node has a routing database, if yes, the updated routing information is sent to the node, i.e. the higher node, 140. If, on the other hand, the lower node does not have the routing database (or is not connected to the updated routing database), the request is sent to a node underlying said lower node, 130A etc. until a node has been found having an updated routing database. Thereafter the updated routing information is sent to the higher node, 140. An answer is sent to the overlying, or higher, node and the answer contains the latest routing information including new nodes and routes etc., 150. The higher node is then updated, 160. Then is examined if the higher node is the node from which the availability question originated, i.e. if the higher node corresponds to the origination node, 170. If this is not the case, the updated routing information is sent to the higher node, 140, etc. until the higher node corresponds to the origination node. The availability information is then presented to the requester, 180, for example a requesting person or an application.

FIG. 8 is a flow diagram describing the adding of a new node to the high availability paths for a receiver. First an administrator of a new node, here called A, gets information about, and realizes that it wants, the offered functionality application, 210. With a new node is here meant a new node in the sense as described with reference to FIG. 7, either an entirely new node or a node already present in the network fetching the functionality application. Node A then fetches the functionality application software, 220. This can be done in different manners, for example through a www request. If the functionality application already has been fetched to node A for use towards another receiver (RX), 230, a data instance for the data towards the new receiver is created, 240. If the functionality application software does not exist in the node, the functionality application software is installed in node A, 230A and a data instance for data towards the receiver is created, 240. A handshaking procedure with underlying (lower) nodes is then initiated. In an advantageous embodiment this communication handshake is started automatically. During this handshaking procedure, node A is provided with information about routes, i.e. different routes it may use and the availability figures for said different routes, 250. The routing database for the receiver is then updated with information about the new node A, 260. Node A then makes the functionality application software or particularly the high availability application including the routing functionality, and the receiver data, available to other nodes, which other nodes either may be entirely new nodes or new nodes fetching the functionality application, 270. Then, when any other node having fetched the functionality application asks for new availability figures from the routing database, it will also be provided with information about the new node, i.e. node A, and it may also start to use a new path over node A, 280.

The routing application will be distributed over the network in that a destination node makes the functionality available to a number of nodes communicating directly with the destination node. These other nodes, on condition that they fetch the functionality application, in turn make the functionality available to other nodes (entirely new nodes or nodes already present in the network) directly connected to them which can then fetch the functionality and in turn offer it to nodes communicating directly with them etc. The routing application will thus be distributed in this manner and "new" nodes will fetch the application in any order hierarchically or in parallel.

The invention is not limited to the shown embodiments but it can be varied in a number of ways within the scope of the claims. It is an advantage of the invention that it is applicable to a dynamically growing network and that conventional equipment can be used.

What is claimed is:

1. A data communication network, comprising:
    a number of origination nodes, destination nodes, and intermediate nodes, wherein the nodes are arranged in a hierarchy, messages are sent from origination nodes via a number of intermediate nodes to destination nodes, and nodes are added and/or removed in an unpredictable way; and a functionality software system accessible by a number of destination nodes, wherein through the functionality software system, a functionality application is made available in at least one destination node; a routing application is associated with the functionality application so that when the functionality application is installed in a node, routing functionality is automatically provided in the node, and the functionality application is offered to other nodes with which the node directly communicates;

whereby when the functionality application is fetched by an overlying node, the overlying node is also provided with the routing functionality, and the functionality application is offered to nodes directly communicating with the overlying node so that a degree of control of availability in the network gradually increases with the number of nodes fetching the functionality application, wherein a number of parallel nodes in each of at least two different layers fetch the functionality application from a respective node in a lower layer, the nodes thereby getting access to the routing functionality for routing messages from origination nodes or from nodes in a higher layer.

2. The data communication network of claim 1, wherein the routing application selects a route at a receiving side.

3. The data communication network of claim 1, wherein the routing application implements routing algorithms for finding a best route to provide a desired degree of availability.

4. The data communication network of claim 1, wherein for a particular destination node, only routing information relevant for routing to the particular destination node is stored.

5. The data communication network of claim 1, wherein a number of destination nodes independently of each other offer at least one functionality application and associated routing application to overlying nodes respectively, thereby providing a separate high availability network relating to the respective destination node.

6. The data communication network according to claim 1, wherein the functionality application is an availability information application.

7. The data communication network of claim 2, wherein availability information is stored in a memory that communicates with at least one of an origination node and an overlying node, and the availability information is continuously updated by an availability information application.

8. The data communication network of claim 2, each provision of routing functionality in a node is given a unique identification address.

9. A data communication network, comprising:

a number of origination nodes, destination nodes, and intermediate nodes, wherein the nodes are arranged in a hierarchy, messages are sent from origination nodes via a number of intermediate nodes to destination nodes, and nodes are added and/or removed in an unpredictable way; and a functionality software system accessible by a number of destination nodes, wherein through the functionality software system, a functionality application is made available in at least one destination node; a routing application is associated with the functionality application so that when the functionality application is installed in a node, routing functionality is automatically provided in the node, and the functionality application is offered to other nodes with which the node directly communicates;

whereby when the functionality application is fetched by an overlying node, the overlying node is also provided with the routing functionality, and the functionality application is offered to nodes directly communicating with the overlying node so that a degree of control of availability in the network gradually increases with the number of nodes fetching the functionality application, wherein routing functionality is provided to nodes in at least two different layers above a destination node and routing is controllable for messages sent from the destination node to an origination node.

10. A data communication network, comprising:

a number of origination nodes, destination nodes, and intermediate nodes, wherein the nodes are arranged in a hierarchy, messages are sent from origination nodes via a number of intermediate nodes to destination nodes, and nodes are added and/or removed in an unpredictable way; and a functionality software system accessible by a number of destination nodes, wherein through the functionality software system, a functionality application is made available in at least one destination node; a routing application is associated with the functionality application so that when the functionality application is installed in a node, routing functionality is automatically provided in the node, and the functionality application is offered to other nodes with which the node directly communicates;

whereby when the functionality application is fetched by an overlying node, the overlying node is also provided with the routing functionality, and the functionality application is offered to nodes directly communicating with the overlying node so that a degree of control of availability in the network gradually increases with the number of nodes fetching the functionality application, wherein at least two routes for carrying duplicated data are provided between nodes in at least two different layers, and the routing functionality enables selecting a route from the at least two routes that best meets predetermined criteria.

11. The data communication network of claim 10, wherein at least some of the nodes are included in an intranet.

12. The data communication network of claim 10, wherein at least some of the nodes are included in a global data communication network.

13. The data communication network of claim 10, wherein at least one origination node comprises a customer administration system.

14. The data communication network of claim 13, wherein a WEB-client addresses the network via one of an Internet and an intranet.

15. The data communication network of claim 10, wherein at least one destination node comprises a service management system.

16. The data communication network of claim 10, wherein at least a number of intermediate nodes comprise proxies.

17. The data communication network of claim 10, wherein each of at least a number of nodes includes a server.

18. A data communication network, comprising:
- a number of origination nodes, destination nodes, and intermediate nodes, wherein the nodes are arranged in a hierarchy, messages are sent from origination nodes via a number of intermediate nodes to destination nodes, and nodes are added and/or removed in an unpredictable way; and
- a functionality software system accessible by a number of destination nodes, wherein through the functionality software system, a functionality application is made available in at least one destination node; a routing application is associated with the functionality application so that when the functionality application is installed in a node, routing functionality is automatically provided in the node, and the functionality application is offered to other nodes with which the node directly communicates;
  - whereby when the functionality application is fetched by an overlying node, the overlying node is also provided with the routing functionality, and the functionality application is offered to nodes directly communicating with the overlying node so that a degree of control of availability in the network gradually increases with the number of nodes fetching the functionality application,
  - wherein at least some of the nodes are included in a global data communication network, and high availability routing is provided for at least one of communication of messages towards a destination node and communication of messages towards an origination node.

19. A data communication network, comprising:
- a number of origination nodes, destination nodes, and intermediate nodes, wherein the nodes are arranged in a hierarchy, messages are sent from origination nodes via a number of intermediate nodes to destination nodes, and nodes are added and/or removed in an unpredictable way; and
- a functionality software system accessible by a number of destination nodes, wherein through the functionality software system, a functionality application is made available in at least one destination node; a routing application is associated with the functionality application so that when the functionality application is installed in a node, routing functionality is automatically provided in the node, and the functionality application is offered to other nodes with which the node directly communicates;
  - whereby when the functionality application is fetched by an overlying node, the overlying node is also provided with the routing functionality, and the functionality application is offered to nodes directly communicating with the overlying node so that a degree of control of availability in the network gradually increases with the number of nodes fetching the functionality application,
  - wherein the routing functionality is provided by a JAVA™ program comprising an interface towards a WEB-server, a calculation part for selecting a node where to route a message, and a sender for sending the message to the selected node.

20. A method of providing high availability communication in a data communication network including a number of hierarchically arranged origination nodes, destination nodes, and intermediate nodes, in which a functionality application is made available at least to one node and with the functionality application a routing functionality is associated, the method comprising the steps of:
- fetching the functionality application to a destination node;
- installing the functionality application and the associated routing application in the destination node,
- presenting the functionality application to at least one possible sending node or node arranged in a higher hierarchical layer that directly communicates with the destination node;
- fetching the functionality application to at least some of the hierarchically higher arranged nodes;
- continuously offering the functionality application to nodes in a higher hierarchical layer that communicate directly with a node when the node has fetched the functionality application so that the routing functionality is installed in a number of nodes;
- using the routing functionality for sending messages in the data communication network;
- adding a number of new nodes to the network in an unpredictable manner;
- to each added node, presenting the functionality application from a node arranged in a lower hierarchical layer;
- fetching the functionality application to at least one added node; and
- informing at least one of a node in a higher hierarchical layer and a possible sending node about possible new routing alternatives.

21. A data communication network, comprising:
- a number of origination nodes, destination nodes, and intermediate nodes, wherein the nodes are arranged in a hierarchy, messages are sent from origination nodes via a number of intermediate nodes to destination nodes, and nodes are added and/or removed in an unpredictable way; and
- a functionality software system accessible by a number of destination nodes, wherein through the functionality software system, a functionality application is made available in at least one destination node; a routing application is associated with the functionality application so that when the functionality application is installed in a node, routing functionality is automatically provided in the node, and the functionality application is offered to other nodes with which the node directly communicates;
  - whereby when the functionality application is fetched by an overlying node, the overlying node is also provided with the routing functionality, and the functionality application is offered to nodes directly communicating with the overlying node so that a degree of control of availability in the network gradually increases with the number of nodes fetching the functionality application,
  - wherein the routing application selects a route at a receiving side, each provision of routing functionality in a node is given a unique identification address, and high availability routing is provided for at least one of communication of messages towards a destination node and communication of messages towards an origination node.

* * * * *